J. P. CABANNE.
METHOD OF PASTEURIZING LIQUID FOOD AND DRINK PRODUCTS IN GLASS CONTAINERS.
APPLICATION FILED APR. 8, 1910. RENEWED MAR. 20, 1911.

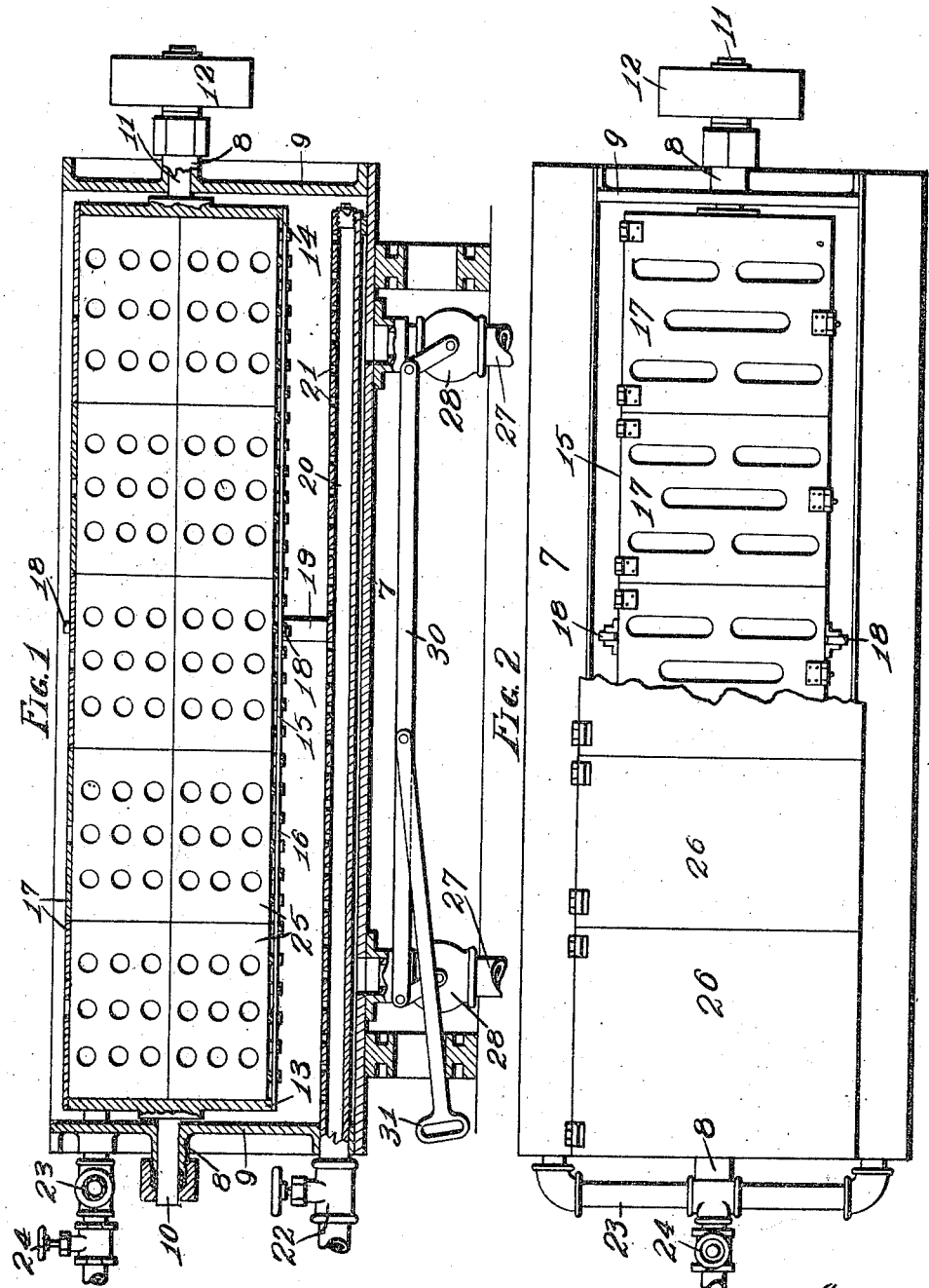

996,209.

Patented June 27, 1911.

2 SHEETS—SHEET 2.

Witnesses
W. C. Stein
L. A. L. McIntyre

Inventor
John P. Cabanne
by Hopkins & Eicks Attys.

UNITED STATES PATENT OFFICE.

JOHN P. CABANNE, OF ST. LOUIS, MISSOURI.

METHOD OF PASTEURIZING LIQUID FOOD AND DRINK PRODUCTS IN GLASS CONTAINERS.

996,209.  Specification of Letters Patent.  Patented June 27, 1911.

Application filed April 8, 1910, Serial No. 554,289. Renewed March 20, 1911. Serial No. 615,656.

*To all whom it may concern:*

Be it known that I, JOHN P. CABANNE, a citizen of the United States, and resident of St. Louis, Missouri, have invented a certain new and useful Improved Method of Pasteurizing Liquid Food and Drink Products in Glass Containers, of which the following is a specification.

My invention relates to an improved method of sterilizing and pasteurizing liquid food and drink products in glass containers, and has for its object to provide a method whereby food and drink products in small glass containers may be sterilized and pasteurized in the containers in which they are to be delivered to the consumer.

Figure 3:
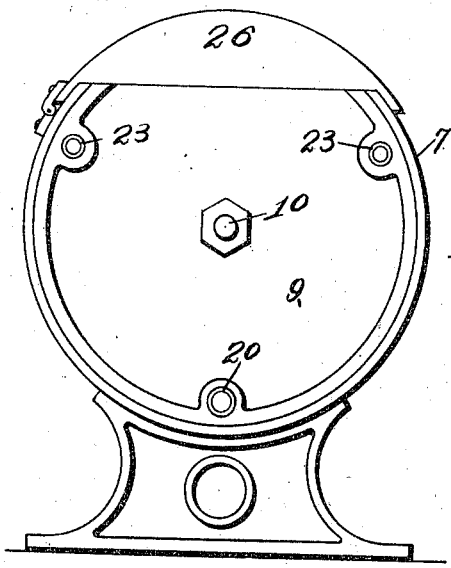
Figure 4:
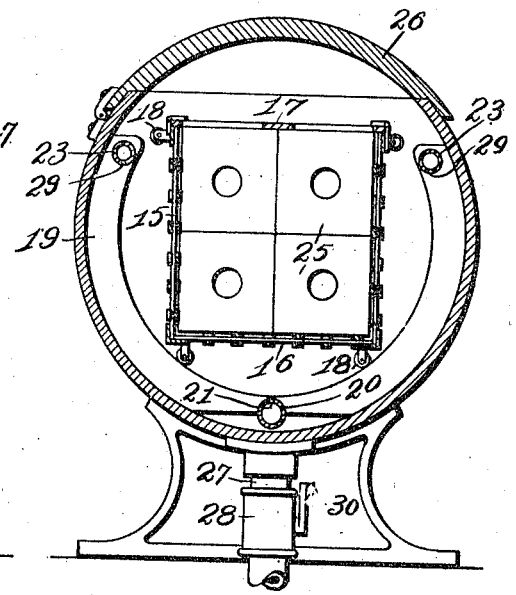
Figure 5:
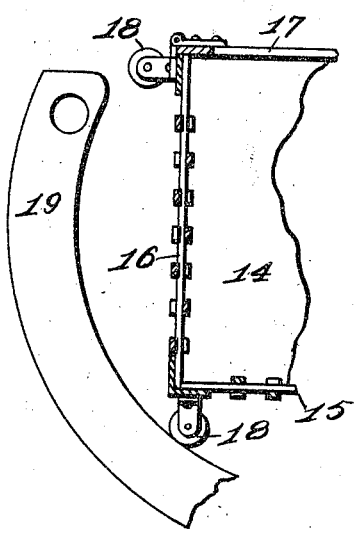
Figure 6:
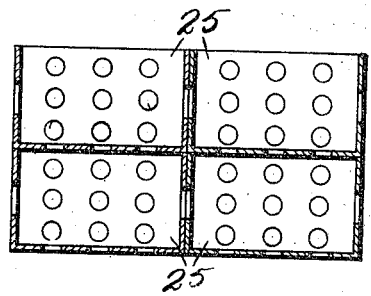

In the drawings—Figure 1 is a longitudinal vertical view in mid-section of a device suitable to be employed in practicing my invention. Fig. 2 is a top plan view of the same. Fig. 3 is an end view of the same. Fig. 4 is a transverse vertical view in midsection of the same. Fig. 5 is an enlarged sectional detail view of the same, showing the bearings with which the revolving sterilizing receptacle is provided. Fig. 6 is an end plan view of the boxes wherein the food products are held in their containers.

With reference to the apparatus illustrated in the drawings, my method may be described as follows:

I provide an outer shell 7 provided with journal boxes 8—8 in the heads 9. In these journal boxes 8 are mounted the trunnions 10 and 11, the trunnion 11 being provided at its outer extremity with the pulley-wheel 12. The trunnions 10 and 11 are mounted respectively in the heads 13 and 14 of the revolving receptacle 15. The receptacle 15 is provided with perforate walls 16 and a perforated hinged sectional cover 17. Midway its length the receptacle 15 is provided at its corners with the bearing wheels 18 adapted to travel on the circular track or band 19 which is mounted in the interior of the outer shell 7. The shell 7 is provided at its bottom with the steam-pipe 20 having perforations 21, to which the admission of steam is controlled by means of the valve 22. Water is fed to the interior of the shell 7 by means of the pipes 23 provided with a valve 24. The revolving receptacle 15 is rectangular in section and is of such dimensions as to receive and hold a predetermined number of rectangular boxes 25, which boxes are provided with perforate sides and bottoms and are open at their tops; the boxes 25 being superimposed upon each other in layers as indicated in Fig. 1, the bottoms of the boxes 25 above the lower layer of said boxes serving as tops for the boxes immediately beneath them, while the cover 17 with which the revolving receptacle 15 is provided serves as a cover for the topmost layer of the boxes 25. Within the boxes 25 are to be seated packages of milk or other food or drink products to be sterilized.

The cover 17 being secured in place by any suitable means, the receptacle 15 is revolved by means of the pulley-wheel 12. The outer shell 7 is provided with the sectional hinged cover 26 whose sections correspond with the sections of the cover 17. Water being admitted to the shell 7 by means of the pipe 23, the valve 22 is opened admitting steam to the water for the purpose of raising the temperature of the water. The desired temperature being thus secured, the receptacle 15 is revolved rapidly upon the trunnions 10 and 11 by means of the pulley-wheel 12, so that the contents of the boxes 25 shall be uniformly heated to a point which will partially pasteurize their contents.

As my method relates to the treatment of liquid food and drink products in which it is desirable to maintain the original flavor and characteristics of the product, I have found that such flavor and characteristics can best be preserved by discontinuous heating; that is to say, by a series of heatings and coolings which will quite as effectually eliminate all bacteria and spore, as well as the maintenance of the product at a high temperature for a considerable length of time. I have found that such continued high temperature has a tendency to deteriorate the product in taste, smell and flavor, and my method is devised to overcome that objection. I therefore immerse the glass containers in the heating fluid at a temperature below 100° Fahrenheit, raise the temperature of the fluid to a point between 140° F. and 190° F., hold the temperature of the fluid at that point until the contents of the revolving glass containers have been brought to the same temperature as that of the fluid in which they are immersed, with the effect of partial or fractional pasteurization. During the entire process the revolution of the containers is continuous. As the temperature of the heating fluid rises in advance of the temperature of the contents of the glass containers, the gradual heating of the glass effects annealing and avoids bursting of the bottles as well.

The first heating has the effect of destroying the bulk of the active bacteria, and I then reduce the heating fluid to a point below 100° F. and maintain it at its low temperature until the contents of the glass containers has descended to the same temperature. The spore remaining in the food or drink product then becomes active and I repeat the former operation of raising the temperature, first of the heating fluid and then of the contents of the glass containers, as another step in the fractional or partial pasteurization of the food or drink product.

The lowering of the temperature of the heating fluid is accomplished by closing the valve 22 and discharging the contents of the shell 7 through the discharge pipes 27, which are opened by means of the valves 28 controlled by the levers 30 and 31; re-opening the valve 24 and discharging cold water within the interior of the shell 7 through the pipes 23 to cool the contents of the boxes 25.

By means of providing the receptacle 15 with the sectional cover 17 and providing the shell 7 with the sectional cover 26, the sections of these covers registering with each other, I am enabled to determine by actual test at any given stage of the perfect pasteurization of the food or drink product, the degree to which pasteurization has been accomplished. This is done by the removal of one or more of the glass containers and the microscopic examination of the food or drink product. Having once determined by such microscopic test the number of successive heatings required for the particular product, which number will be determined by the perfect elimination of all of the spore and bacteria recognizable through the microscope, I have established a record which will be followed in subsequent pasteurization of the same food or drink product.

After the glass containers have been originally immersed in the heating fluid at any temperature below 100° F., and above 32° F., the subsequent coolings are made to a temperature between 70° F. and 90° F.

The pipes 23 extend along the length of the interior of the shell 7, as indicated in Fig. 2, and are perforated as indicated by the numeral 29; the perforations 29 being of such number and so arranged as to permit the interior of the shell 7 to be speedily filled with water to the desired height.

By means of the described method, I provide means whereby commodities, such as milk, may be uniformly sterilized and pasteurized without danger of coagulation or irregular heating; the contents of each of the packages contained in the boxes 25 being agitated during the process of heating and cooling and caused to pass rapidly through the mass of heating fluid contained in the shell 7, thus securing exact uniformity of temperature throughout the mass of the material to be sterilized.

Having thus fully described my invention, what I claim as new and desire to have secured to me by the grant of Letters Patent, is:

The improved method of pasteurizing liquid food and drink products in glass containers, consisting in subjecting the glass containers carrying said product to continuous revolution within a body of heating fluid, in which fluid they are immersed at a temperature below 100° Fahrenheit, and the temperature of which fluid is alternately raised to a pasteurizing temperature of 140° F. to 190° F., and again lowered to a temperature between 70° F. and 90° F. until all spore and bacteria existing in the product have been destroyed.

In testimony whereof, I have signed my name to this specification, in presence of two subscribing witnesses.

JOHN P. CABANNE.

Witnesses:
ALFRED A. EICKS,
WALTER C. STEIN.